Oct. 3, 1933. R. M. UHLMANN ET AL 1,928,770
MACHINE FOR CHAMFERING GEARS
Filed Aug. 3, 1931    8 Sheets-Sheet 1

Inventors:
Richard Max Uhlmann
and
John Arthur Maywhort
By F. DeWitt Goodwin
Attorney Patented Oct. 3, 1933

1,928,770

UNITED STATES PATENT OFFICE

1,928,770

MACHINE FOR CHAMFERING GEARS

Richard Max Uhlmann, Philadelphia, and John Arthur Maywhort, Cheltenham, Pa., assignors to The Bilgram Machine Works, Incorporated, Philadelphia, Pa., a corporation of Pennsylvania Application August 3, 1931. Serial No. 554,736

8 Claims. (Cl. 90—41)

Our invention relates to a machine for chamfering the tooth ends of gears, such as gears for the driving mechanism upon the rear axles of automobiles or other gears of similar nature. Machines of this general type include a work spindle carrying the gear to be chamfered and a reciprocating ram carrying the cutting tool, or tools, for beveling or chamfering the gear teeth. The work spindle is at rest during the working portion of the stroke of the ram, and the spindle is indexed, or rotated intermittently, the distance of one tooth during the return stroke of the ram. When the cutting tools are out of engagement with the gear to be chamfered, the latter must be positioned, or indexed, so that upon the next working stroke of the ram the tools will cut the next successive tooth or teeth. When a gear to be chamfered is put on the work spindle, the gear must be adjusted circumferentially so that the teeth of the gear during the intermittent indexing will consecutively be in the proper relation with the chamfering tools.

The object of our invention is to provide a method and apparatus for insuring the proper adjustment of the gear to be chamfered upon the work spindle of a machine, so that the gear will be properly positioned upon the spindle relatively to the indexing of the spindle and the movements of the cutting tools during the next working stroke of the latter, thus preventing the possibility of damaging the gear which is to be chamfered.

A further object is to provide means in the form of a stock divider for adjusting a new gear, which is to be chamfered, upon the work spindle, and provide a stop which will prevent the adjustment of the work, or gear, during the time the spindle is being indexed, or rotated.

A further object is to provide mechanism which will automatically move the stop into and out of the operative position during each complete operation of the indexing and ram operating mechanism.

A further object is to arrange the timing of the stop mechanism so that during the indexing of the work spindle, the stop will prevent the adjusting means from being operated for the purpose of adjusting the gear to be chamfered upon the spindle.

A further object is to provide means for operating the machine by hand so that the work spindle may be rotated to a position to complete the indexing operation and release the stop, so that the adjusting means may be operated after the indexing of the spindle has taken place and during the time the cutting tools are withdrawn from the work.

A further object is to provide mechanism for automatically disengaging the hand operating means when power is applied for operating the machine.

A further object is to provide means preventing the engaging and also for disengaging the hand operating means which is actuated by the means for shifting the power on and off the machine.

A further object is to provide novel means for adjusting the ram carrying the chamfering tools whereby the movements of the ram and the tools may be varied relatively to the gear to be chamfered.

A further object is to locate the adjusting means for varying the movement of the ram between the ram and a rocker arm.

A further object is to provide a rack which is engaged by the rocker arm and to adjustably mount the rack in the ram, and also provide means in the form of a single clamp bolt for fastening the rack in the adjusted position in the ram.

A further object is to provide a shearing or finishing tool for removing the burrs from the gear after the chamfering operation is finished.

A further object is to provide a novel means for mounting the shearing tool whereby it will automatically adjust itself to gears having slight variations in diameters.

A further object of the invention is to provide a machine constructed in a compact and convenient form.

A further object is to construct a housing for enclosing the driving mechanism of the machine for reducing the possibility of injury to the operator.

These together with various other novel features of construction and arrangements of the parts, which will be more fully hereinafter described and claimed, constitute our invention.

Referring to the accompanying drawings.

Figure 1:
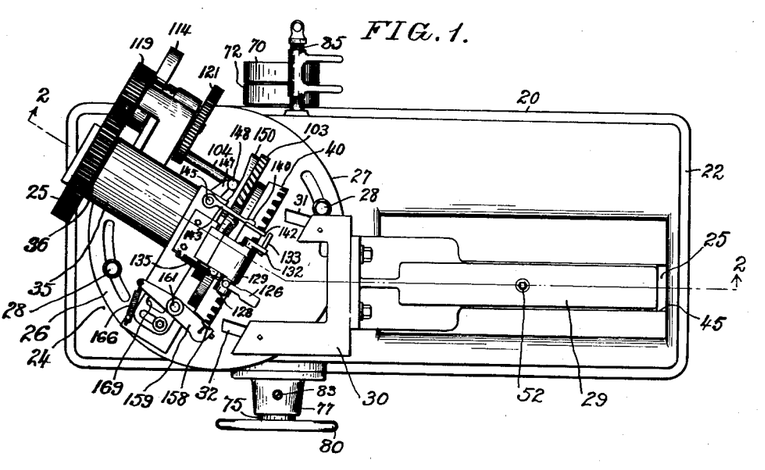
Fig. 1 is a plan view of our improved gear chamfering machine.
Figure 2:
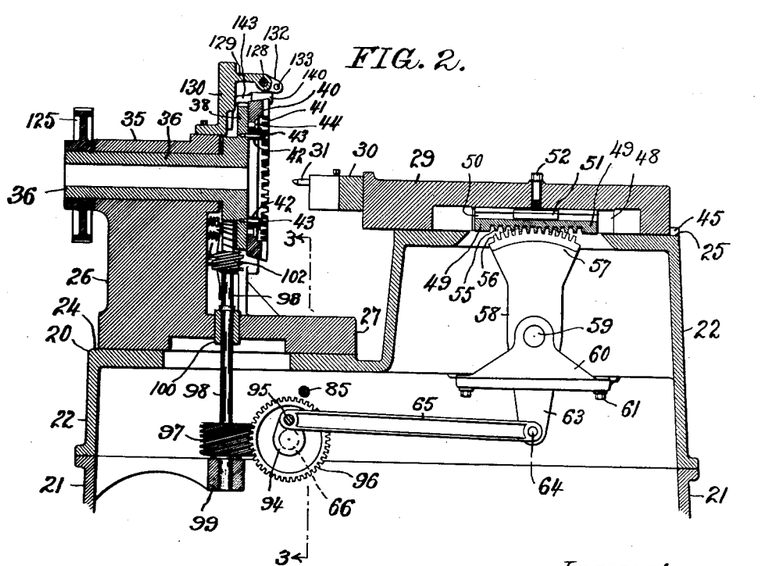
Fig. 2 is a vertical longitudinal sectional view on line 2—2, Fig. 1 with a portion of the base removed.

In the drawings in which like reference characters refer to like parts, 20 is a housing forming the main supporting part of our machine. The housing comprises a lower base section 21 forming a supporting pedestal arranged to rest upon the floor, only a portion of which base is shown in the drawings, and an upper bed plate section 22. Said sections are secured together to form a rigid housing of hollow construction for enclosing a portion of the operating mechanism. The bed plate section 22 is provided with two horizontal facing surfaces 24 and 25, as shown in Fig. 2.

A head 26 having a horizontal disk 27 is rotatably mounted upon the facing surface 24, upon which it may be adjusted to any radial position and rigidly secured by clamp bolts 28. Upon the other facing surface 25 is slidably mounted a ram 29 carrying a bracket 30 on which are secured the chamfering tools 31 and 32.

Figures 7, 8:
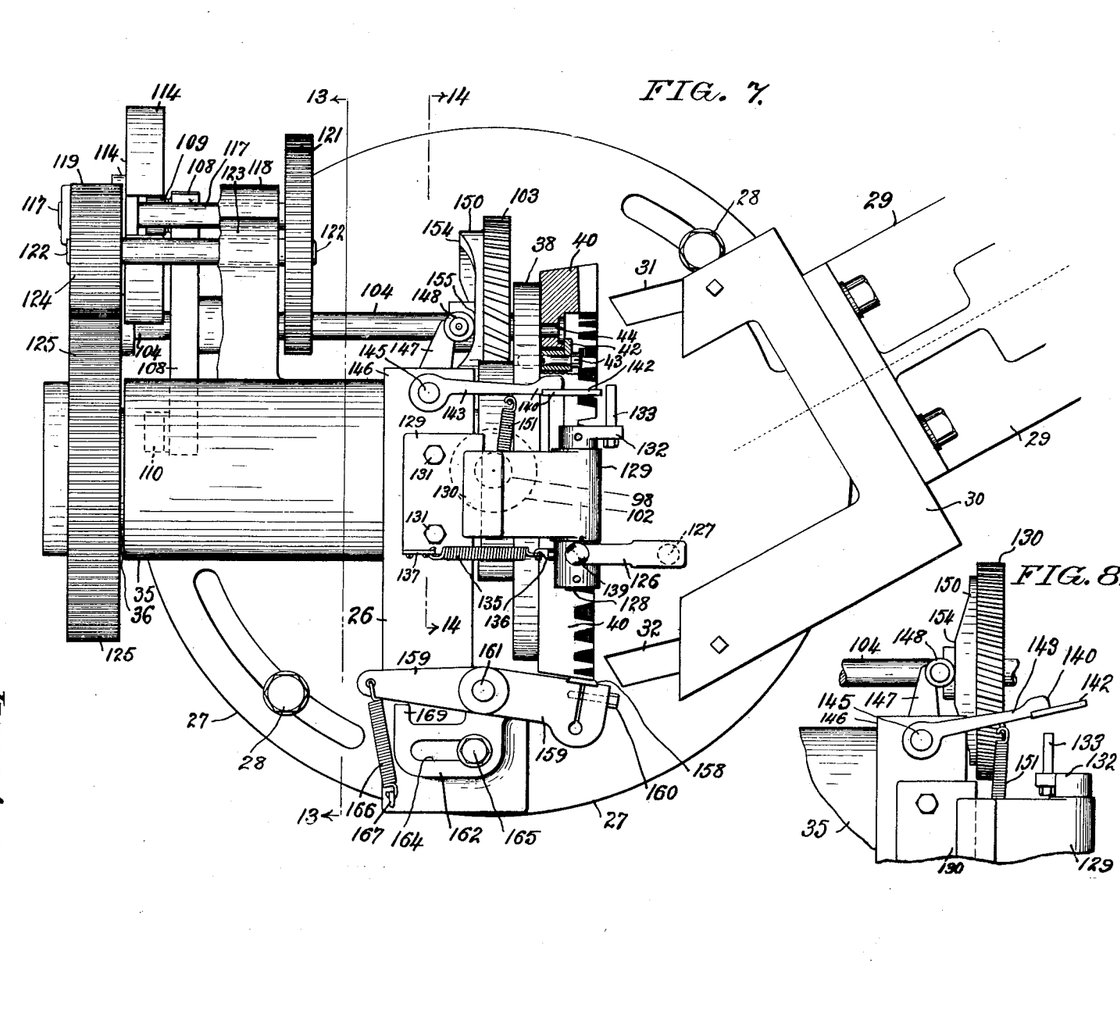
Fig. 7 is an enlarged plan view of a portion of the machine shown in Fig. 1.
Fig. 8 is a plan view of a portion of Fig. 7, showing the stop mechanism in a position to release the stock divider.

The head 26 is provided with a bearing 35 in which is rotatably mounted a hollow shaft or work spindle 36. At one end of the spindle 36 is formed an enlarged disk 38 having a vertical facing surface against which the work, or gear 40 having teeth 41 which are to be chamfered, is secured by means of clamps 42 and clamp bolts 43 extending through the clamps into the disk 38 for clamping the work upon the disk, as shown in Figs. 2 and 7.

The gear 40 to be chamfered is usually in the form of a ring which surrounds the clamps 42, which clamps concentrically position the gear upon the disk. The gear is provided with the usual bolt holes 44.

Figures 9, 10:
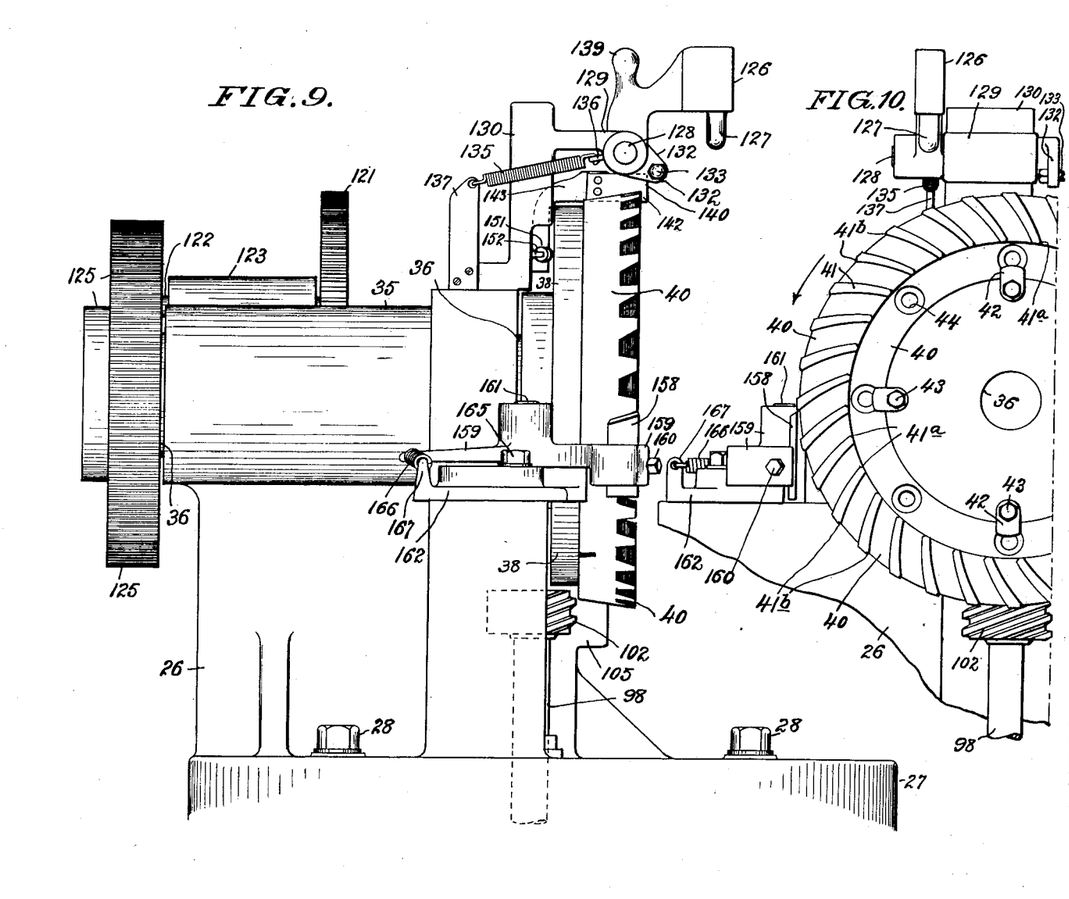
Fig. 9 is a side elevation of the head and work spindle, as shown in Fig. 7.
Fig. 10 is a partial end elevation of Fig. 9.
Figure 12:
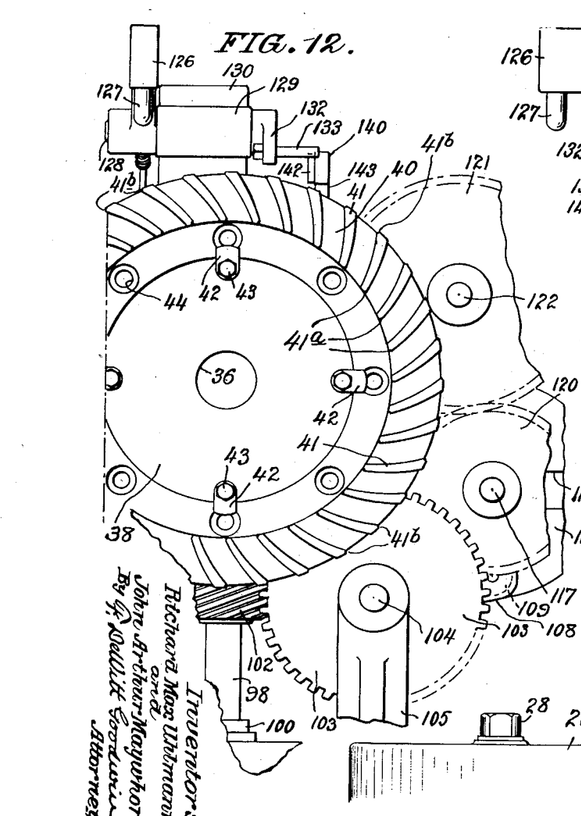
Fig. 12 is a partial end elevation of Fig. 11.

The head 26 may be rotated horizontally to a suitable angular position, relatively to the line of movement of the ram 29, so that the chamfering tools 31 and 32 will form the chamfered surfaces 41a and 41b upon the teeth 41, indicated in Figs. 10 and 12 in a manner well known in the art.

Figure 5:
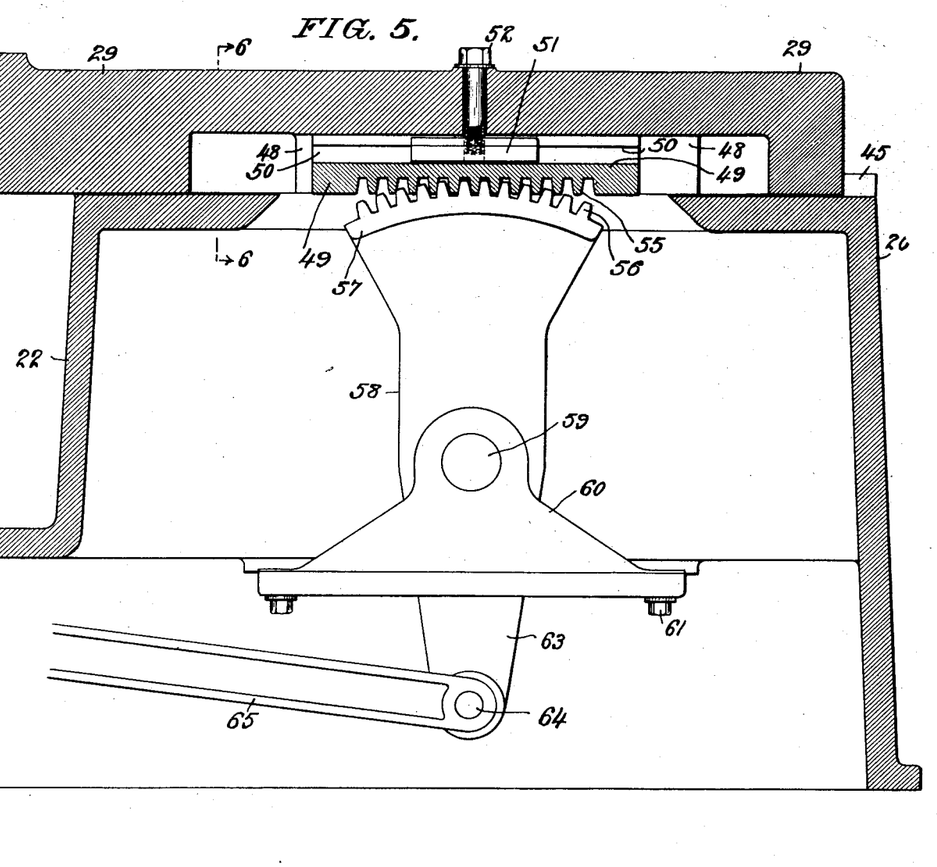
Fig. 5 is an enlarged vertical sectional view of the housing, the ram and the operating mechanism for the ram, as shown in Fig. 2.
Figure 6:
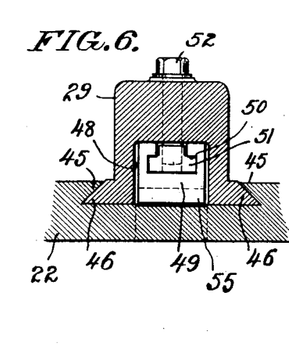
Fig. 6 is a transverse vertical section on line 6—6, Fig. 5.

The ram 29 is adjustably mounted in a novel manner upon the section 22 of the housing, as shown in Figs. 1, 2, 5 and 6. The section 22 is provided with a dovetail groove forming guides 45, in which the beveled flanges 46 of the ram are slidably mounted, as shown in Figs. 5 and 6.

The ram 29 is of hollow construction to form a longitudinal channel 48 to receive a rack 49 which is slidably mounted in the channel 48. Said rack is provided with an under-cut groove 50 in which is slidably mounted a clamp block 51. A bolt 52 extends loosely through an aperture formed through the ram. The bolt 52 is provided with an enlarged head and a threaded inner end which enters a threaded aperture formed in the block 51. The rack 49 may be adjusted longitudinally relatively to the ram 29 and rigidly secured to the latter by tightening the bolt 52.

The lower face of the rack 49 is provided with gear teeth 55, which are engaged by teeth 56 on a segmental portion 57 of the rocker arm 58. The rocker arm 58 is pivotally mounted upon a shaft 59 in a bearing 60 secured within the hollow section 22 of the housing by means of bolts 61. The lower member 63 of the rocker arm 58 is pivotally connected by a pin 64 with a connecting rod 65 operated by mechanism hereafter described for reciprocating the rocker arm 58, and the ram 29.

The relation of the cutting tools 31 and 32 to the gear 40 to be chamfered may be readily adjusted by simply loosening the clamp screw 52, whereby the ram 29 and clamp block 51 may be moved relatively to the rack 49 and when the tools are in the desired position, the ram 29 and the rack 49 may be readily secured together by tightening the clamp bolt 52, thus it will be seen that an adjustment can be made without changing the relative position of the rack 49 upon the rocker arm 58.

The operating mechanism for reciprocating the ram 29 and for rotating or indexing the spindle 36 carrying the work or gear 40, consists of a crank shaft 66 rotatably mounted in bearings 67 and 68 secured in opposite sides of the section 22 of the housing 20. The ends of the crank shaft extend beyond the housing, and upon one end of the shaft is secured a belt pulley 70 through which the machine may be operated by power from a belt 71 shown in dot and dash lines in Fig. 3. A loose pulley 72 is also mounted upon the crank shaft to receive the belt when it is desired to stop the machine.

Figure 3:
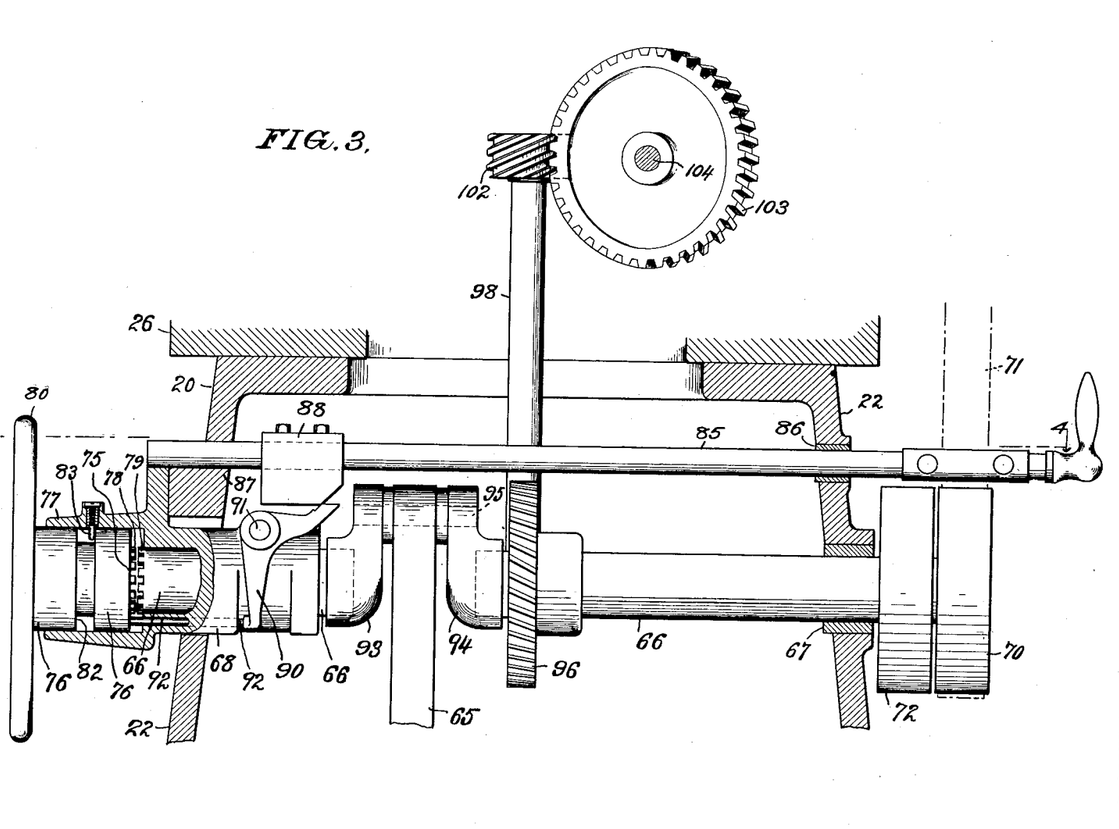
Fig. 3 is a partial transverse vertical section on line 3—3, Fig. 2, drawn on a larger scale.
Figure 4:
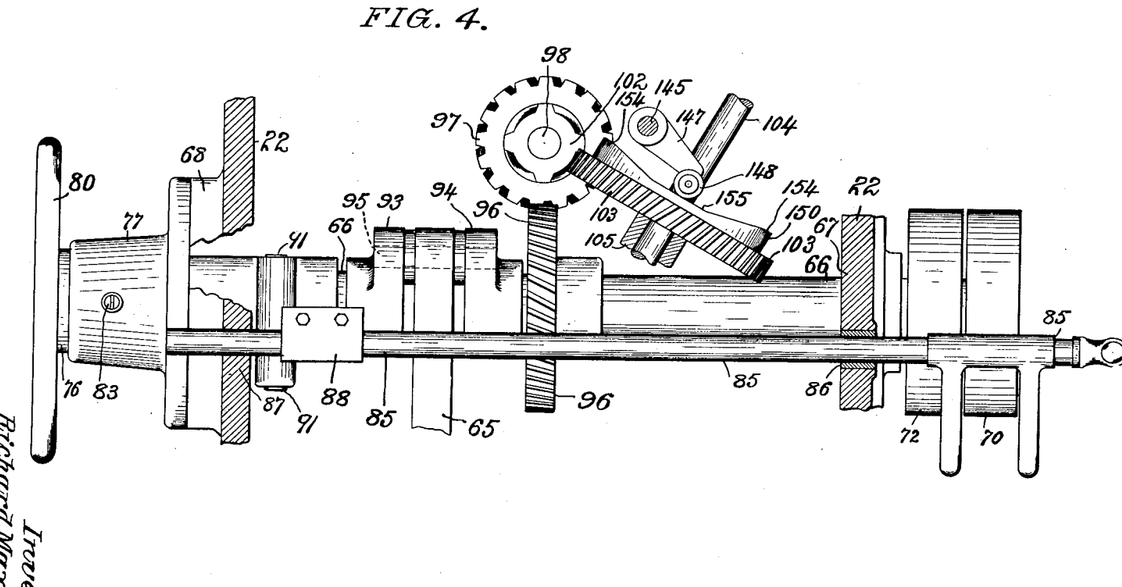
Fig. 4 is a plan view of Fig. 3, partially in section as on line 4—4, Fig. 3.

The opposite end of the crank shaft 66, as shown in Fig. 3, is provided with a clutch 75 for rotating the crank shaft by hand. A clutch shaft 76 is loosely mounted in a casing 77 forming part of the bearing 68. Said shaft 76 is positioned in alignment with the crank shaft, and is slidably and rotatably mounted in the casing 77.

The inner end of the clutch shaft 76 is provided with teeth 78 and the adjacent end of the crank shaft is provided with teeth 79 which may be engaged by pushing the clutch shaft toward the crank shaft.

Upon the outer end of the clutch shaft 76 is a hand wheel 80 for turning the clutch shaft and for moving the clutch shaft inwardly to engage the teeth 78 of the clutch shaft with the teeth 79 of the crank shaft. The clutch shaft 76 is provided with an annular groove 82 and the casing is provided with a stop pin 83, the inner end of which enters the groove 82 in the clutch shaft and limits the distance the shaft 76 may be moved longitudinally.

The clutch is automatically disengaged by mechanism associated with a belt shift rod 85 which is slidably mounted in bearings 86 and 87 formed in the housing of the machine. The rod 85 is positioned in a line parallel with the length of the crank shaft 66, and secured upon the rod 85 is a dog 88.

A bell crank lever 90 is pivotally mounted upon a pivot shaft 91 secured in the bearing 68 rigidly secured upon the machine. One arm of the bell crank lever 90 is in engagement with a push rod 92 which is slidably mounted in said bearing 68 and having its opposite end abutting against a transverse surface formed upon the inner end of the clutch shaft 76.

The other arm of the bell crank lever 90 is normally located in the path of the dog 88 upon the shift rod 85, so that when the shift rod is in the position shown in Fig. 3 for shifting the belt to pulley 70, which is secured upon the crank shaft 66, the bell crank lever will be moved into a position to force the push rod 92 against the end face of the clutch shaft 76 and move the latter into a position to disengage the teeth from the end of the crank shaft, as shown in Fig. 3.

By this arrangement, when it is desired to turn the shaft by means of the hand wheel, it is first necessary to release the power from the crank shaft by moving the belt shift rod to a position which will shift the belt to the loose pulley 72. This movement of the shift rod will move the dog 88 out of engagement with the bell crank lever, which in turn releases the push rod 92 from the clutch shaft. The hand wheel and the clutch shaft may then be moved inwardly for engaging the teeth on the end of the crank shaft whereby the latter may be turned by means of the hand wheel.

The crank shaft 66 is provided with crank arms 93 and 94 connected by a crank pin 95, upon which is pivotally mounted one end of the connecting rod 65 provided for reciprocating the rocker arm and the ram 29.

A spiral gear wheel 96 is secured upon the crank shaft 66 and meshes with a spiral gear 97 secured upon a vertically positioned shaft 98 for imparting a rotary motion to the latter. The lower end of the shaft 98 is mounted in a bearing 99 upon the housing, and its upper portion is mounted in a bearing 100 secured upon the center of the disk 27 of the rotatable head 26, carrying the work spindle 36, and the gear or work 40 to be operated upon.

The upper end of the vertical shaft 98 has secured thereon a spiral gear 102, which is in mesh with a larger spiral gear 103 secured upon a longitudinally positioned cam shaft 104, mounted in bearings 105 and 106 carried by the disk 27 of the head 26, shown in Figs. 2, 9, 10 and 12. A continuous rotary motion is thus imparted to the cam shaft 104 from the crank shaft 66.

Figure 11:
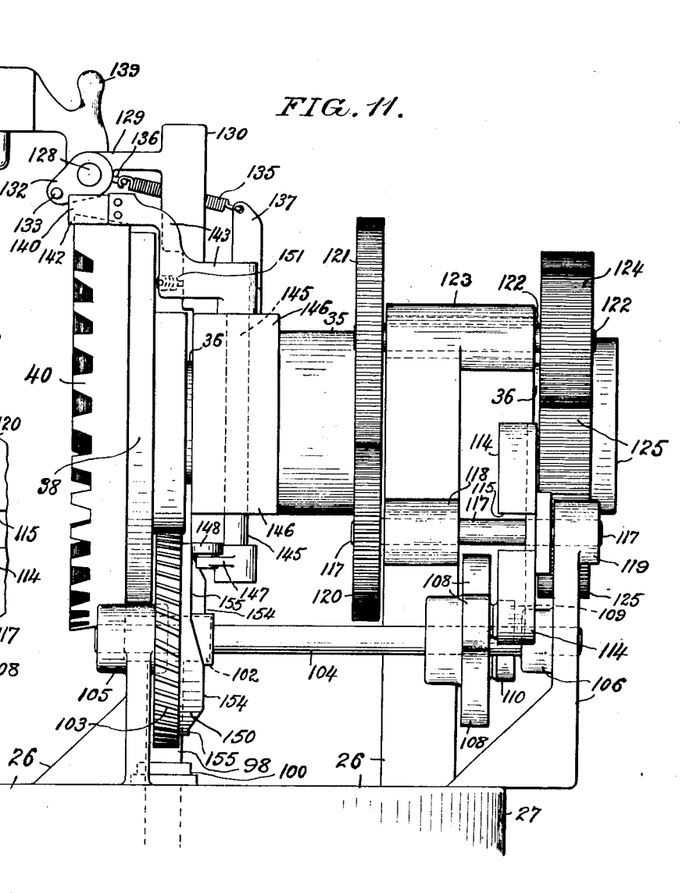
Fig. 11 is a view similar to Fig. 9 looking toward the opposite side of the head.
Figure 13:
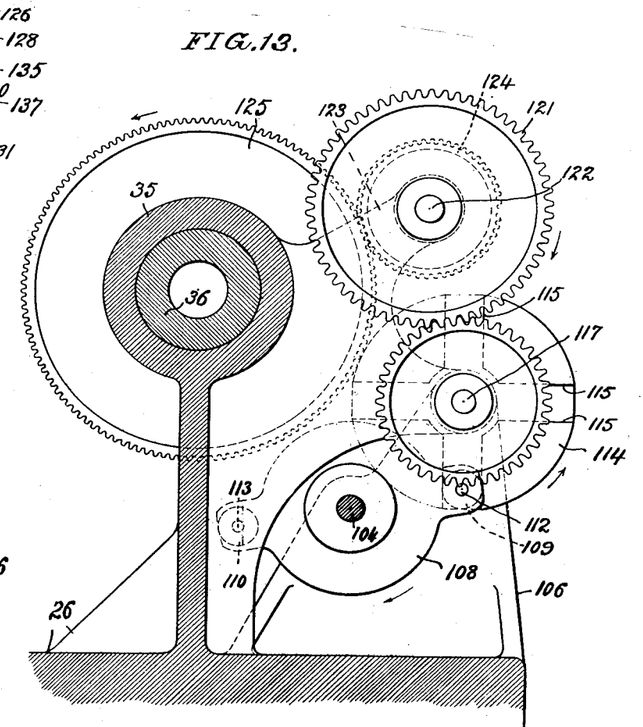
Fig. 13 is a transverse vertical section on line 13—13, Fig. 7.
Figure 14:
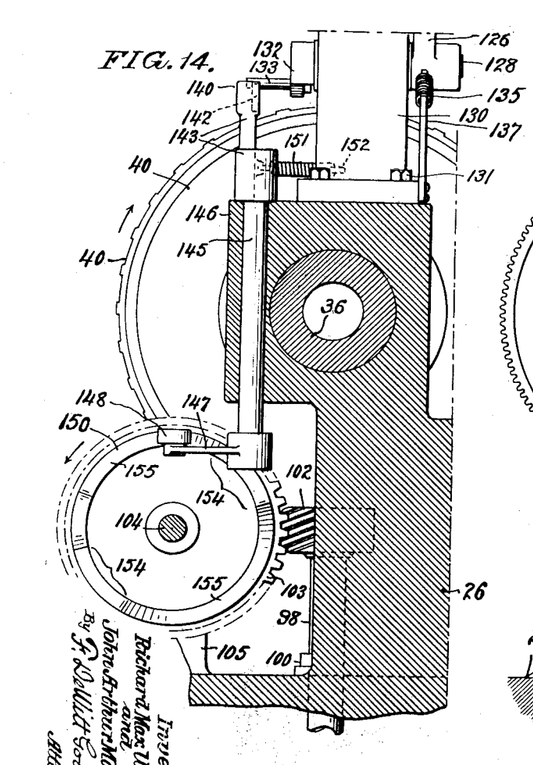
Fig. 14 is a transverse vertical section on line 14—14, Fig. 7.

A disk 108, shown in Figs. 7, 11 and 13, is secured upon the cam shaft 104 and two rollers 109 and 110 are loosely mounted upon pins 112 and 113, secured at diametrically opposite portions of the disk 108. A wheel or cam 114 having four radial grooves 115 formed in one face thereof is provided for receiving the rollers 109 and 110 successively. The rollers 109 and 110 impart an intermittent rotary motion to the grooved wheel 114.

The wheel 114 is secured upon a horizontal shaft 117 having its opposite ends rotatably mounted in bearings 118 and 119. Said shaft 117 is positioned in parallel relation to the cam shaft 104 carrying the disk 108 and rollers 109 and 110. Said shafts 104 and 117 are located at the proper distance from each other so that the rollers 109 and 110 upon the disk 108 will enter the radial grooves 115 formed in the wheel 114 successively, as the rollers are rotated by the disk 108. The cam shaft 104 and the disk 108 rotate continuously and the grooved wheel 114 is rotated intermittently, due to the period in the rotation of the disk 108 when both of the rollers are out of engagement with the grooved wheel 114, thus allowing the wheel 114 to remain idle during a portion of the revolution of the disk 108 carrying the rollers.

The indexing of the spindle 36 and gear 40 to be chamfered is effected from the intermittent rotary motion imparted to the grooved wheel 114. A gear wheel 120 is secured upon the shaft 117 on which the grooved wheel 114 is secured. An idler gear 121 meshes with the gear wheel 120. A shaft 122 on which the gear wheel 121 is secured is rotatably mounted in a bearing 123 upon the head 26. The shaft 122 has secured upon its opposite end an idler gear wheel 124 which meshes with a gear wheel 125 secured upon the work spindle 36. The gear wheels are of the proper size so that the spindle 36 will be rotated one tooth of the gear 40 to be chamfered, for each complete revolution of the crank shaft 66, which latter also reciprocates the chamfering tools 31 and 32.

The gearing between the crank shaft 66 and the spindle 36 is so timed that the indexing of the spindle 36 will take place when the crank shaft withdraws the chamfering tools from the gear 40. The gear 40 to be chamfered should be attached and adjusted to the spindle 36 after the indexing of the spindle has been completed.

The proper timing of the machine for the attachment of a new gear 40 to be chamfered is insured by the novel mechanism comprising, a stock divider, shown in Figs. 1, 7, 8 and 9. Said stock divider consists of an arm 126 carrying the gear engaging pin 127, arranged for entering the space between two of the teeth of said gear 40. The arm 126 is secured upon a pivot shaft 128, positioned horizontally and loosely mounted in a bearing 129 forming part of a bracket 130 secured upon the head 26 by bolts 131. Upon the opposite end of the shaft 128 is secured another arm 132 carrying a stop pin 133, extending parallel with the shaft 128.

A spring 135, shown in Figs. 7 and 9, is secured between a hook 136 on the arm 126 and a plate 137 on the bracket 130, for normally holding the arm in the position shown in Fig. 7. The arm 126 is also provided with a handle 139, by which the arm 126 may be moved, against the action of the spring 135, for engaging the stock divider pin 127 with the gear 40, when adjusting the gear circumferentially upon the disk 38 of the spindle 36.

A stop 140 is provided for the engagement of the stop pin 133 for preventing the gear engaging pin 127 from being moved into engagement with the gear 40 during the indexing of the latter. The stop 140 consists of a stop plate 142 secured upon an arm 143, which swings in a horizontal plane at right angles to the movement of the stop pin 133. The arm 143 carrying the stop plate 142 is secured upon the upper end of a rock shaft 145 positioned vertically and loosely mounted in a bearing 146, upon the head 26. Upon the lower end of the rock shaft 145 is an arm 147 carrying a roller 148 which is held against the face of a cam 150 by a spring 151, secured between the arm 143 at the upper end of the rock shaft 145 and fastening device 152 upon the bracket 130 secured upon the head 26.

The cam 150, shown in Figs. 1, 7, 11 and 14, is formed upon the rear face of the spiral gear wheel 103 which is secured upon the cam shaft 104 and continuously rotated by the central vertical shaft 98 through the gear wheels 102 and 103. Said cam 150 is provided with high places 154 and low places 155, arranged for moving the roller 148, which in turn rotates the rock shaft 145 which swings the stop plate 142 into and out of a position to be engaged by the stop pin 133.

When the spindle 36 is being rotated for indexing the gear 40, through the intermittently driven shaft 117, the cam 150 will be in a position in which the roller 148 will be upon a low place 155 of the cam, thus permitting the spring 151 to move the stop plate 142 into the path of the stop pin 133, as shown in Fig. 7, thereby locking the stock divider so that the gear engaging pin 127 cannot be moved into a tooth space of the gear 40. Thus it will be seen that the stock divider engaging pin 127 cannot be employed for adjusting the gear 40 upon the spindle 36 during the time when the intermittently driven shaft 117 is engaged with either of the rollers 109 or 110 upon the continuously rotating disk 108 which is secured on the cam shaft 104.

Should the machine be stopped in a position in which the indexing driving mechanism is engaged and a new gear 40 to be chamfered is about to be placed upon the spindle 36, it will be found that the stock divider engaging pin 127 cannot be moved into engagement with the new gear 40, because the stop plate 142 will prevent the swinging of the stock divider stop pin 133, as shown in Figs. 1, 7, 11 and 12.

When the machine is stopped during the indexing of the spindle it must be operated by turning the hand wheel 80 until the indexing is completed, or until the rollers 109 and 110 on the disk 108 are out of engagement with the grooved wheel 114, then the cam 150 will be in a radial position in which a high place 154 will operate the roller 148, and the arms 147 and 143, into the position shown in Fig. 8, which will move the stop plate 142 out of the path of the stop pin 133 on the stock divider, thus permitting the latter to be operated so that the engaging pin 127 can enter a tooth space of the gear 40 when the latter is properly adjusted circumferentially upon the spindle 36.

When so adjusted the gear is securely clamped upon the spindle by the bolts 43, and the machine may be again operated by power.

The chamfering tools 31 and 32 mounted upon the ram 29 are adjusted relatively to the gear 40 to be chamfered so that the tools will chamfer the edges of the gear, in a manner well known in the art.

The chamfering tools leave burrs upon the gear 40 adjacent to the surfaces which have been chamfered and novel means are provided for removing said burrs.

A burr removing tool 158 is yieldingly held in engagement with gear 40 for automatically finishing the peripheral surface of the gear.

The finishing or shearing tool 158, shown in Figs. 1, 7, 9 and 10, is adjustably secured upon an arm 159 by means of a clamp bolt 160. The arm 159 is pivotally mounted upon a pin 161 secured upon a bearing plate 162, which is supported upon a horizontal facing surface formed upon the head 26. The bearing plate 162 is provided with an elongated slot 164, see Fig. 7, which is occupied by a clamp screw 165 arranged for adjustably securing the bearing plate 162 upon the head 26.

A spring 166 is mounted between a fastening device 167 upon the bearing plate and the end of the arm 159 opposite to the end carrying the finishing tool 158. The spring 166 yieldingly holds the tool 158 against the surface of the gear 40 and the tool 158 will automatically adjust itself to gears of different diameters, as gears made in quantities are rarely exactly alike in diameter.

By yieldingly mounting the shearing or finishing tool 158 relatively to the gear to be finished the necessity of adjusting the position of the tool for variations in the diameters of different gears is avoided.

A stop 169 is provided upon the bearing plate 162, for limiting the movement of the arm 159 by the actions of the spring 166, so that the tool 158 can only move within a narrow range and therefore will not interfere with the placing of the next gear 40 upon the spindle.

Our novel method of locking the stock divider 126 out of action consists of moving a stop 140 into and out of engaging position with the stock divider in unison with the mechanism for indexing the spindle and the gear 40, and will automatically prevent the use of the stock divider until the machine has completed the indexing, thus insuring the proper timing of the machine.

The operation of our invention is as follows:

The gear 40 to be chamfered is mounted upon the clamps 42 carried by the disk 38 on the work spindle 36. The stock divider 126 is pressed down with one hand to determine the position in which the machine has been stopped. If the indexing of the spindle has been completed, the stock divider engaging pin 127 will engage the gear 40 and will not engage the stop plate 142, this will indicate to the operator that the machine has been stopped with the spindle in a position in which the gear 40 may be clamped upon the spindle, as the indexing of the spindle has been completed.

If the stock divider pin 127 will not engage the gear 40 but engages the stop plate 142, the operator must turn the crank shaft 66 by means of the hand wheel 80, which latter is first pressed inwardly to engage the clutch between the hand wheel and the crank shaft. By turning the hand wheel the machine may be operated until the indexing of the spindle 36 has been completed, at which time the cam 150 will have operated the arms until the stop plate 142 is out of the path of the stop pin 83 on the stock divider. The stock divider engaging pin 127 may then be moved against the gear 40 and the latter may be adjusted circumferentially upon the spindle until the engaging pin 127 enters a tooth space of the gear and the gear may then be securely clamped upon the spindle.

The head 26 is rotated horizontally until the spindle is at the desired angle relatively to the stroke of the ram carrying the cutting tools so that the reciprocation of the cutting tools 31 and 32 will chamfer the gear teeth in a manner well known in the art.

Power is applied for operating the machine by the operation of the belt shifting rod 85, which upon its initial movement will disengage the clutch between the hand wheel and the crank shaft so that the hand wheel will not rotate when the machine is operated by power, and the hand wheel cannot be forced inwardly to engage the clutch due to the position of the dog 88, without first moving the shift rod for shifting the power from the machine. By this arrangement the hand wheel remains idle when the machine is driven by power, thus avoiding the possibility of the operator being injured, or his garments being caught in the revolving hand wheel.

When the machine is in operation the work spindle and the gear to be chamfered are rotated or indexed one tooth during the time the cutting tools are being withdrawn from the wheel by the ram 29.

As the gear to be chamfered is indexed, the finishing or shearing tool 158 removes the burrs from the periphery of the wheel 40, and by the novel arrangement, herein disclosed, the finishing tool automatically adjusts itself to gears having slight variations in diameter.

Our novel adjusting means between the ram and the operating arm 58 and the gear segment is of great advantage, as it permits the adjustment of the ram and the chamfering tools without changing the timing of the operating segment or members of the machine, and the adjustment may be made by the loosening and tightening of a single clamp bolt 52.

The housing is designed so that the crank shaft and ram operating segment are entirely enclosed, thus eliminating the possibility of injury to the operator. The machine generally is arranged in a compacted and convenient form so that it will occupy a minimum amount of space and is simple in construction and in operation.

Various changes in the construction and arrangement of the parts may be made without departing from our invention.

We claim:

1. A gear chamfering machine, having in combination, a bearing head, a work spindle mounted in the head, means for intermittently rotating the spindle, clamp means upon the spindle for adjustably securing work thereon to be operated upon, a manually operated stock divider movably mounted upon said head and movable into engagement with the work, a stop movably mounted upon the head, and means operatively associated with said stop and said means for intermittently rotating the spindle arranged for moving the stop into engaging position with said divider when the spindle is rotated.

2. A gear chamfering machine having in combination, a bearing head, a spindle mounted in the head, means for intermittently rotating the spindle, clamp means upon the spindle for adjustably securing work thereon to be operated upon, a manually operated stock divider movably mounted upon the head and movable into and out of engagement with the work, a stop movably mounted upon the head, a cam rotatable in unison with said means for rotating the spindle, and an arm actuated by the cam arranged for moving the stop into engaging position with said divider when the spindle is rotated.

3. A gear chamfering machine having in combination, a bearing head, a spindle rotatably mounted in the head, a clamp upon the spindle for adjustably securing thereon a stock gear to be chamfered, a stock divider pivotally mounted upon the head and manually movable into engagement with the gear, a spring operatively associated with the stock divider and said head tending to withdraw the stock divider from the gear, a stop arm, a shaft pivotally mounted upon the head upon which shaft the arm is secured, a cam, an arm upon said shaft in operative engagement with the cam for moving the arm into and out of locking position with the stock divider, a cam shaft upon which the cam is secured, means for imparting a continuous rotary motion to the cam shaft, and means associated with the cam shaft for imparting intermittent rotary motion to the spindle.

4. A gear chamfering machine having in combination, a bearing head, a spindle rotatably mounted in the head, a clamp upon the spindle for adjustably securing thereon a stock gear to be chamfered, a stock divider pivotally mounted upon the head, a handle upon the stock divider by which the latter is manually movable into engaging position with the gear, a stop arm movably mounted upon the head, a cam operatively associated with the arm arranged for moving the latter relatively to the divider, a cam shaft rotatably mounted in said head upon which the cam is secured, means for imparting a continuous rotary motion to the cam shaft, and driving means actuated by the cam shaft for imparting intermittent rotary motion to the spindle.

5. A gear chamfering machine having in combination, a bearing head, a stock spindle positioned horizontally and rotatably mounted in said head, a clamp upon the spindle for adjustably securing a gear to be chamfered upon the spindle, a manually operated stock divider having a portion thereof arranged to be inserted in a tooth space of the gear, a shaft upon one end of which the divider is secured, a bearing in which said shaft is rotatably mounted and positioned horizontally above the year and at right angles to the axis of the spindle, a spring operatively associated with the divider tending to hold the divider out of engagement with the gear, an arm secured upon the opposite end of said shaft, a pin secured upon the arm and extending parallel with said shaft, a stop arm movably mounted upon the bearing head, a spring operatively associated with the stop arm tending to hold the latter positioned to be engaged by the pin for holding the divider out of engagement with the gear, a cam operatively associated with the stop arm for moving the latter out of engaging position with the pin, means for continuously rotating said cam, and means for rotating the spindle intermittently relatively to the rotation of the cam.

6. A gear chamfering machine having in combination, a housing, a crank shaft rotatably mounted in the housing, a bearing head upon the housing, a work spindle in the head, means for intermittently indexing the spindle actuated by the crank shaft, a clamp upon the spindle for adjustably securing a gear to be chamfered, a stock divider mounted upon the head and manually movable into engagement with the gear for circumferentially adjusting the gear upon the spindle before it is clamped thereon, a stop movably mounted upon the head, a cam rotatable by the crank shaft in unison with said means for indexing the spindle and arranged for moving the stop out of engaging position with said divider after the indexing means has completed the indexing of the spindle, and a hand wheel upon the crank shaft by which the spindle may be rotated for completing the indexing operation and for rotating the cam to a position to disengage the stop from the divider.

7. A gear chamfering machine having in combination, a housing, a driving shaft upon the housing for operating the machine, a hand wheel, a clutch shaft rotatably and slidably mounted in the housing upon which clutch shaft the hand wheel is secured, clutch teeth upon the end of the clutch shaft, clutch teeth upon the end of the driving shaft positioned to be engaged by the teeth of the clutch shaft, said clutch shaft having a portion of larger diameter than the driving shaft forming a transverse annular surface surrounding the teeth of the clutch shaft, a push rod having one end thereof in engagement with said transverse surface of the clutch shaft, a bell crank lever pivotally mounted upon the housing having one arm in engagement with the push rod, a shift rod slidably mounted in the housing, a dog upon the shift rod arranged to engage one arm of the bell crank lever for actuating the push rod for disengaging the clutch shaft from the driving shaft when the shift rod is moved into a position to apply power for rotating the driving shaft.

8. A gear chamfering machine having in combination, a bearing head, a spindle rotatably mounted in said head upon which a gear to be chamfered is secured, a chamfering tool operatively associated with said spindle, a finishing tool for removing burrs from the surface of said gear, an arm, securing means upon one end of the arm in which the finishing tool is secured, a horizontal facing surface upon said head, a bearing plate, said plate having an elongated slot formed therein, a clamp screw upon the head and occupying said slot for adjustably securing the plate upon the facing surface, a pin upon said plate upon which the arm is loosely pivoted and movable in a plane parallel with the facing surface, a spring mounted between said plate and said arm tending to urge the finishing tool toward said gear, and a stop upon the plate for limiting the movement of the arm by the action of the spring when the gear is removed from the spindle.

RICHARD MAX UHLMANN.
JOHN ARTHUR MAYWHORT.